(12) United States Patent
Fradet et al.

(10) Patent No.: US 10,587,403 B2
(45) Date of Patent: Mar. 10, 2020

(54) ENHANCED OBFUSCATION OR RANDOMIZATION FOR SECURE PRODUCT IDENTIFICATION AND VERIFICATION

(71) Applicant: INEXTO SA, Lausanne (CH)

(72) Inventors: Erwan Fradet, Grandvaux (CH); Patrick Chanez, Chevres (CH); Philippe Chatelain, Chavornay (CH)

(73) Assignee: Inexto SA, Lausanne (CH)

( * ) Notice: Subject to any disclaimer, the term of this patent is extended or adjusted under 35 U.S.C. 154(b) by 0 days.

(21) Appl. No.: 15/742,496

(22) PCT Filed: Aug. 13, 2016

(86) PCT No.: PCT/EP2016/069316
§ 371 (c)(1),
(2) Date: Jan. 5, 2018

(87) PCT Pub. No.: WO2017/025645
PCT Pub. Date: Feb. 16, 2017

(65) Prior Publication Data
US 2018/0205543 A1    Jul. 19, 2018

Related U.S. Application Data

(60) Provisional application No. 62/204,753, filed on Aug. 13, 2015.

(51) Int. Cl.
*H04L 9/08* (2006.01)
*H04L 9/32* (2006.01)
(Continued)

(52) U.S. Cl.
CPC .............. *H04L 9/0869* (2013.01); *G06F 7/58* (2013.01); *G06F 21/44* (2013.01); *H04L 9/0866* (2013.01);
(Continued)

(58) Field of Classification Search
CPC ... H04L 9/0869; H04L 9/0866; H04L 9/3234; H04L 9/3247; H04L 63/0876;
(Continued)

(56) References Cited

U.S. PATENT DOCUMENTS 4,035,615 A    7/1977   Best et al.
4,094,244 A    6/1978   Edwards et al.
(Continued)

FOREIGN PATENT DOCUMENTS

CN    101354753    1/2009
CN    101609626    12/2009
(Continued)

OTHER PUBLICATIONS

Dodge et al., Codes of Life: Identification Codes and the Machine-Readable World, Dec. 2005, Environment and Planning D: Society and Space, vol. 23, pp. 851-881 (Year: 2005).*

(Continued)

*Primary Examiner* — Kenneth W Chang

(57) ABSTRACT

The invention relates to a method of defining a numerical basis by combining at least two different ranges of numbers which can be used to obfuscate an alphanumeric character. This basis can be used for product identification or other methods of creating unique tracking or identification numbers when used in combination with conversion functions.

20 Claims, 5 Drawing Sheets

(51) Int. Cl.
  *G06F 7/58* (2006.01)
  *G06F 21/44* (2013.01)
  *H04L 29/06* (2006.01)

(52) U.S. Cl.
  CPC .......... *H04L 9/3234* (2013.01); *H04L 9/3247* (2013.01); *H04L 63/0876* (2013.01); *H04L 2209/08* (2013.01); *H04L 2209/16* (2013.01)

(58) Field of Classification Search
  CPC ... H04L 2209/08; H04L 2209/16; G06F 7/58; G06F 21/44
  See application file for complete search history.

(56) References Cited

U.S. PATENT DOCUMENTS

| | | | |
|---|---|---|---|
| 4,354,101 A | 10/1982 | Hester et al. | |
| 4,463,250 A | 7/1984 | McNeight et al. | |
| 4,529,871 A | 7/1985 | Davidson | |
| 4,860,226 A | 8/1989 | Martin et al. | |
| 4,963,719 A | 10/1990 | Brooks et al. | |
| 5,382,779 A | 1/1995 | Gupta | |
| 5,467,433 A | 11/1995 | Lamprecht, Jr. et al. | |
| 5,621,864 A | 4/1997 | Benade et al. | |
| 5,646,389 A | 7/1997 | Bravman et al. | |
| 5,767,498 A | 6/1998 | Heske, III et al. | |
| 5,805,779 A | 9/1998 | Christopher et al. | |
| 5,837,983 A | 11/1998 | Actis et al. | |
| 5,850,080 A | 12/1998 | Herzig | |
| 5,892,900 A | 4/1999 | Ginter et al. | |
| 5,930,215 A | 7/1999 | Fite et al. | |
| 5,974,150 A | 10/1999 | Kaish et al. | |
| 6,069,955 A | 5/2000 | Coppersmith et al. | |
| 6,122,403 A | 9/2000 | Rhoads | |
| 6,134,561 A | 10/2000 | Brandien et al. | |
| 6,212,638 B1 | 4/2001 | Lee et al. | |
| 6,217,966 B1 | 4/2001 | Finster et al. | |
| 6,226,619 B1 | 5/2001 | Halperin et al. | |
| 6,260,029 B1 | 7/2001 | Critelli | |
| 6,272,634 B1 | 8/2001 | Tewfik et al. | |
| 6,371,375 B1 | 4/2002 | Ackley et al. | |
| 6,442,276 B1 | 8/2002 | Doljack | |
| 6,456,729 B1 | 9/2002 | Moore | |
| 6,546,729 B2 | 4/2003 | Hellat et al. | |
| 6,547,137 B1 | 4/2003 | Begelfer et al. | |
| 6,712,275 B1 | 3/2004 | Borg | |
| 6,725,366 B1 | 4/2004 | Swanberg | |
| 6,832,202 B1 | 12/2004 | Schuyler et al. | |
| 6,892,947 B1 | 5/2005 | Jam et al. | |
| 6,963,846 B1 | 11/2005 | Kelly et al. | |
| 6,996,543 B1 | 2/2006 | Coppersmith et al. | |
| 7,028,901 B2 | 4/2006 | Carlson | |
| 7,188,258 B1 | 3/2007 | Aggarwal et al. | |
| 7,246,748 B1 | 7/2007 | Feuerman et al. | |
| 7,267,271 B2 | 9/2007 | Rhea | |
| 7,283,630 B1 | 10/2007 | Doljack | |
| 7,497,379 B2 | 3/2009 | Chen et al. | |
| 8,175,578 B2 | 5/2012 | McCown et al. | |
| 2001/0047340 A1 | 11/2001 | Snow et al. | |
| 2002/0053796 A1 | 5/2002 | McCann et al. | |
| 2002/0091593 A1 | 7/2002 | Fowler | |
| 2002/0158133 A1 | 10/2002 | Conzola et al. | |
| 2002/0158137 A1 | 10/2002 | Grey et al. | |
| 2003/0042312 A1 | 3/2003 | Cato | |
| 2003/0051767 A1 | 3/2003 | Coccaro et al. | |
| 2003/0074223 A1 | 4/2003 | Hickle et al. | |
| 2003/0126034 A1 | 7/2003 | Cheney et al. | |
| 2004/0024790 A1 | 2/2004 | Everett | |
| 2004/0084530 A1 | 5/2004 | McQueen et al. | |
| 2004/0117265 A1 | 6/2004 | Hoffman | |
| 2004/0140362 A1 | 7/2004 | Allen | |
| 2004/0172260 A1 | 9/2004 | Junger et al. | |
| 2004/0212480 A1 | 10/2004 | Carrender et al. | |
| 2005/0006469 A1 | 1/2005 | Nonneman et al. | |
| 2005/0097054 A1 | 5/2005 | Dillon | |
| 2005/0108044 A1 | 5/2005 | Koster | |
| 2005/0127176 A1 | 6/2005 | Dickinson et al. | |
| 2005/0189255 A1 | 9/2005 | Safian | |
| 2005/0234823 A1 | 10/2005 | Schimpf | |
| 2005/0246237 A1 | 11/2005 | Hudetz et al. | |
| 2005/0273369 A1 | 12/2005 | Ota et al. | |
| 2005/0273434 A1 | 12/2005 | Lubow | |
| 2005/0288938 A1 | 12/2005 | Date et al. | |
| 2006/0011726 A1 | 1/2006 | Chen et al. | |
| 2006/0080190 A1 | 4/2006 | Furukawa et al. | |
| 2006/0091209 A1 | 5/2006 | He | |
| 2006/0143180 A1 | 6/2006 | Peterson et al. | |
| 2006/0144940 A1 | 7/2006 | Shannon et al. | |
| 2007/0001006 A1 | 1/2007 | Schuessler et al. | |
| 2007/0024449 A1 | 2/2007 | Bilyeu et al. | |
| 2007/0051816 A1* | 3/2007 | Chu | G06F 3/147 235/492 |
| 2007/0170241 A1* | 7/2007 | Grant | G06Q 30/06 235/375 |
| 2007/0203808 A1 | 8/2007 | Sekimoto et al. | |
| 2008/0046263 A1 | 2/2008 | Sager et al. | |
| 2008/0066167 A1 | 3/2008 | Andri | |
| 2009/0014537 A1 | 1/2009 | Gelbman | |
| 2009/0105866 A1 | 4/2009 | Fontanot | |
| 2009/0159666 A1 | 6/2009 | O'Brien et al. | |
| 2009/0230190 A1 | 9/2009 | Chanez et al. | |
| 2009/0323967 A1* | 12/2009 | Peirce | H04L 9/0869 380/278 |
| 2010/0258641 A1 | 10/2010 | Yu | |
| 2011/0154046 A1 | 6/2011 | Fradet et al. | |
| 2011/0265428 A1 | 11/2011 | Schmitz | |
| 2012/0102334 A1 | 4/2012 | O'Loughlin et al. | |
| 2012/0130868 A1 | 5/2012 | Loken | |
| 2012/0215918 A1 | 8/2012 | Vasters et al. | |
| 2012/0228388 A1 | 9/2012 | Kuo et al. | |
| 2012/0254052 A1 | 10/2012 | Gao et al. | |
| 2012/0284505 A1 | 11/2012 | Smith et al. | |
| 2012/0310848 A1 | 12/2012 | Gao et al. | |
| 2013/0004946 A1 | 1/2013 | Chesnut et al. | |
| 2013/0099901 A1 | 4/2013 | Jones et al. | |
| 2013/0169409 A1 | 7/2013 | Chang et al. | |
| 2013/0226326 A1 | 8/2013 | Yoshida et al. | |
| 2013/0283156 A1 | 10/2013 | Al Badrashiny et al. | |
| 2013/0297929 A1 | 11/2013 | Chaves et al. | |
| 2014/0046852 A1* | 2/2014 | Chatelain | G06Q 10/06 705/50 |
| 2014/0122479 A1 | 5/2014 | Panferov et al. | |
| 2014/0173685 A1 | 6/2014 | Bittles et al. | |
| 2014/0173688 A1 | 6/2014 | Fischer et al. | |
| 2014/0189362 A1 | 7/2014 | Van Den Broeck et al. | |
| 2014/0351601 A1 | 11/2014 | Jozwiak | |
| 2014/0367464 A1 | 12/2014 | Herzig | |
| 2015/0269559 A1 | 9/2015 | Inotay et al. | |
| 2015/0310386 A1 | 10/2015 | Fradet et al. | |
| 2015/0317644 A1 | 11/2015 | Chanez et al. | |
| 2015/0332210 A1 | 11/2015 | Niquille et al. | |
| 2016/0027021 A1 | 1/2016 | Kerdemelidis | |
| 2016/0072626 A1* | 3/2016 | Kouladjie | G06F 21/36 713/189 |
| 2016/0299685 A1 | 10/2016 | Zhai et al. | |
| 2016/0307153 A1 | 10/2016 | Loken et al. | |
| 2017/0109549 A1 | 4/2017 | Fradet et al. | |
| 2018/0131520 A1 | 5/2018 | Brockhaus et al. | |

FOREIGN PATENT DOCUMENTS

| | | |
|---|---|---|
| CN | 102542215 | 7/2012 |
| EP | 1 645 992 A | 4/2006 |
| EP | 2104067 | 9/2009 |
| EP | 2172882 | 4/2010 |
| FR | 2 900 486 A | 11/2007 |
| GB | 2342743 | 4/2000 |
| JP | H-05151381 A | 6/1993 |
| JP | H07-156459 A | 6/1995 |
| JP | H08-69247 A | 3/1996 |
| JP | A-2001-328711 | 11/2001 |
| JP | A-2002-7970 | 1/2002 |
| JP | 2003-104562 A | 4/2003 |

(56) References Cited

FOREIGN PATENT DOCUMENTS

| | | |
|---|---|---|
| JP | 2003208234 | 7/2003 |
| JP | 2003233794 | 8/2003 |
| JP | 2005-060080 A | 3/2005 |
| JP | 2005/115890 | 4/2005 |
| JP | A-2005-200187 | 7/2005 |
| JP | A-2005-263472 | 9/2005 |
| JP | 2005-316940 A | 11/2005 |
| JP | 2006229582 | 8/2006 |
| JP | 2007-018355 A | 1/2007 |
| JP | 2007-528830 A | 10/2007 |
| JP | 2008-515741 A | 5/2008 |
| JP | 2009-151668 | 7/2009 |
| KR | 100911762 B1 | 8/2009 |
| RU | 2199781 C1 | 2/2003 |
| RU | 2216776 C2 | 11/2003 |
| RU | 2225641 C2 | 3/2004 |
| WO | WO-02/073551 A1 | 9/2002 |
| WO | WO-2005/083644 A | 9/2005 |
| WO | WO-2006/038114 A1 | 4/2006 |
| WO | WO-2010/063909 | 6/2010 |
| WO | WO-2014/122479 | 8/2014 |

OTHER PUBLICATIONS

Melgar et al. An alternative proposal of tracking products using digital signatures and QR codes, Jun. 2014, IEEE Colombian Conference on Communications and Computing, pp. 1-4 (Year: 2014).*
"Best Compression algorithm for a sequence of integers", Nov. 12, 2008, Stack Overflow. (XP-002697996).
"Databases—No longer fit for purpose for Serialisation and Track & Trace", 2012.
Extended European Search Report in 15152959.1, dated Jul. 10, 2015, 4 pages.
PCT Written Opinion of the International Searching Authority in PCT/EP2016/051853, dated Nov. 4, 2016, 11 pages.
Extended European Search Report in 15153386.6, dated Oct. 16, 2015, 7 pages.
PCT Written Opinion of the International Searching Authority in PCT/EP2016/052008, dated Jan. 31, 2015, 10 pages.
PCT International Search Report in PCT/EP2016/072453, dated Dec. 5, 2016.
PCT International Search Report in PCT/EP2016/069316, dated Oct. 26, 2016.
PCT International Search Report in PCT/EP2016/070138, dated Dec. 7, 2016.
PCT International Search Report in PCT/EP2016/070137, dated Nov. 14, 2016.
China National Intellectual Property Administration Search Report for Application No. 201580033643.9, 2 pages, dated Jul. 25, 2019.

* cited by examiner $$\begin{cases} m_{0,2} = MUPI \\ m_{i,1} = (m_{i-1,2} \times CGOK_{i,1}) \bmod (10 \times 366 \times 24 \times 60 \times 2210) \\ m_{i,2} = (m_{i,1} \oplus CGOK_{i,2}) \\ IF(m_{i,2} > 10 \times 366 \times 24 \times 60 \times 1100 \times 2210) \rightarrow m_{i,2} = m_{i,1} \\ MSUPI = m_{8,2} \end{cases}$$

Fig. 2

ENHANCED OBFUSCATION OR RANDOMIZATION FOR SECURE PRODUCT IDENTIFICATION AND VERIFICATION

This application is the National Stage of International Application No. PCT/EP2016/069316, filed Aug. 13, 2016, which claims the benefit of U.S. Provisional Application No. 62/204,753 filed Aug. 13, 2015, the contents of both of which are hereby incorporated in their entireties.

The present invention relates generally to techniques for enciphering alphanumeric characters in connection with marking products with secure identification codes and verifying of those codes, and also to systems and methods for managing the distribution of secure production configuration instructions and generating secure product identifiers.

Existing methods for product identification typically involve the application of a unique identifier to a product at the time of packaging. These systems do not scale efficiently in organizations having multiple production facilities, or in production lines capable of packaging at a very high rate. Additionally, existing identifier methods are not sufficiently secure because they are not associated with secure production configuration instructions and do not carry additional product information beneficial to regulatory authorities and merchants.

There exists a need for an improved method and apparatus for securely controlling and authorizing the production of manufactured items, as well as marking manufactured items with secure product identifiers, particularly one which can be used for tax verification, production volume verification and authentication of manufactured items.

Existing systems encipher alphanumeric characters used as product identifiers on a character by character basis. This limits these systems, such as for numbers, generally for 0 to 9 or, if only letters are used, limits the systems to the number of letters in the alphabet used multiplied by two (including capital letters and lower case letters). This invention addresses these shortcomings.

The following embodiments of the invention are exemplary and are not intended to be limiting of the scope of the invention. While one or more embodiments of the present invention have been described, various alterations, additions, permutations and equivalents thereof are included within the scope of the invention. In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. Various computations that are described below, such as those within the code initialization, generation, and authentication procedures, need not be performed in the order disclosed, and other embodiments using alternative orderings of the computations could be readily implemented. In addition to being reordered, the computations could also be decomposed into sub-computations with the same results.

Embodiments of the invention will now be described, by way of example, with reference to the accompanying drawings, in which:

FIG. 2 illustrates an example method for obfuscating data.

Figure 1:
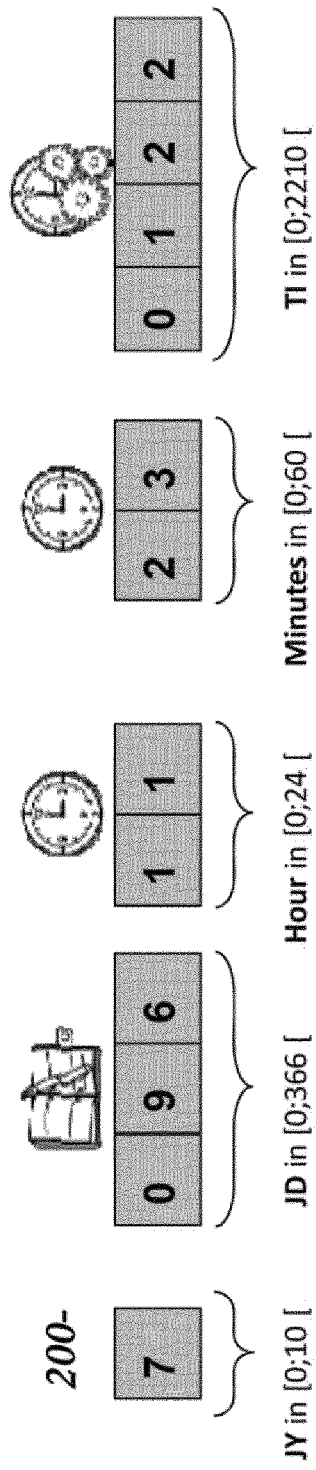
FIG. 1 illustrates an example method for calculating a machine identifier.

According to an embodiment of the invention for a method for obfuscating data stored on a network, the method comprises: defining and storing information descriptive of the state of a computing machine as machine number (MNUM), the information descriptive of the state including the number of bases comprising the information descriptive of the state; generating a machine secure unique product identifier (MSUPI), as a reversible mathematical transformation of a machine unique product identifier (MUPI), based on information descriptive of the state of a computing machine, the step of calculating MSUPI comprising: defining the number of steps to be imax, for each step generating a first random number Code Generation Obfuscation Key ($CGOK_{i,1}$) and a second random number Code Generation Obfuscation Key ($CGOK_{i,2}$), generating comprising: calculating a first random number ($CGOK_{i,1}$) coprime with a number based on the information descriptive of the state of the computing machine (MNUM); calculating a second random number ($CGOK_{i,2}$) having equal or fewer bit size as (MNUM); defining $m_{0,2}$=MUPI; calculating for each element i, from i=1 to imax−1: $m_{i,1}=(m_{i-1,2} \times CGOK_{i,1})$ mod (MNUM); $m_{i,2}=(m_{i,1}$ mod $CGOK_{i,2})$; if $(m_{i,2}>$MNUM$) \rightarrow m_{i,2}=m_{i,1}$; defining MSUPI=$m_{imax,2}$; and storing the machine secure unique product identifier (MSUPI) in an electronic data store. The embodiment described above, as well as the alternative and additional embodiments described herein, may be embodied in a computer-implemented invention, computer system, or a computerized data carrier.

According to an alternative or additional embodiment, the information descriptive of the state of the computing machine comprises a combination of time information and product number. According to an alternative or additional embodiment, the time information includes Julian year, Julian day, production hour, and production minute. According to an alternative or additional embodiment, the information descriptive of the state includes the value of an incremental counter reset on a periodic basis. According to an alternative or additional embodiment, the number based on the information descriptive of the state of the computing machine is calculated as 10×366×24×60×Time Identifier. According to an alternative or additional embodiment, Time Identifier is defined as the integer 2210. According to an alternative or additional embodiment, a Secure Unique Product Identifier (SUPI), a 12-character alphanumeric code is obtained such that SUPI=(p×m) mod (MNUM×mNoise× RunLim).

According to an alternative or additional embodiment for generating a code for securely identifying products produced at a production facility, the method comprises: electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token;

transmitting the validated configuration data to a signature module; at the signature module, signing the validated configuration data; at an identification module, receiving a request for a product identifier and generating a product identifier in response to the request, wherein generating the product identifier is performed by: defining and storing information descriptive of the state of a computing machine as machine number (MNUM), the information descriptive of the state including the number of bases comprising the information descriptive of the state; generating a machine secure unique product identifier (MSUPI), as a reversible mathematical transformation of a machine unique product identifier (MUPI), based on information descriptive of the state of a computing machine, the step of calculating MSUPI comprising: defining the number of steps to be imax, for each step generating a first random number Code Generation Obfuscation Key ($CGOK_{i,1}$) and a second random number Code Generation Obfuscation Key ($CGOK_{i,2}$), generating comprising: calculating a first random number ($CGOK_{i,1}$) coprime with a number based on the information descriptive of the state of the computing machine (MNUM); calculating a second random number ($CGOK_{i,2}$) having equal or fewer bit size as (MNUM); defining $m_{0,2}$=MUPI; calculating for each element i, from i=1 to imax−1: $m_{i,1}=(m_{i-1,2} \times CGOK_{i,1})$ mod (MNUM); $m_{i,2}=(m_{i,1}$ mod $CGOK_{i,2})$; if $(m_{i,2}>$MN-UM$)\rightarrow m_{i,2}=m_{i,1}$; defining MSUPI=$m_{imax,2}$; storing the machine secure unique product identifier (MSUPI) in an electronic data store as the product identifier; transmitting the product identifier from the identification module to a signature module; digitally signing the product identifier at the signature module; and transmitting the digitally signed product identifier to a printer module.

According to an alternative or additional embodiment, the method further comprises: electronically receiving configuration data from an electronic data store; electronically storing the configuration data for a production run, wherein the configuration data for the production run specifies parameters used in the production of products; transmitting the configuration data to an authorization module; at an authorization module: determining whether the production run is authorized; generating validated configuration data comprising a key, a representation of a plurality of authorized product identifiers, and a security token; transmitting the validated configuration data to a signature module; and at the signature module, signing the validated configuration data.

According to an alternative or additional embodiment, the request is for a range of identifiers. According to an alternative or additional embodiment, the method further comprises determining if the configuration data for the production run is authorized; if the production run is authorized: generating a security token and associating the token with the configuration data; and digitally signing the configuration data by generating a digital signature and associating the digital signature with the configuration data.

According to an alternative or additional embodiment, the machine unique product identifier (MUPI) is transformed without padding the machine unique product identifier (MUPI) such that the bit length the machine unique product identifier (MUPI) equals the bit length of the machine secure unique product identifier (MSUPI).

In an alternative or additional embodiment, the method for verification of a secure machine unique product identifier comprises: a verification module receiving for verification a MSUPI; assigning MSUPI as $m_{0,2}$; the verification module retrieving a first random number $CGOK_{i,1}$ and a second random number, $CGOK_{i,2}$ and imax associated with the retrieved random numbers and received MSUPI; calculating for each element i, from i=1 to imax−1: $m_{i,1}=(m_{i-1,2}$ mod $CGOK_{i,2})$; if $(m_{i,2}>$MNUM$)\rightarrow m_{i,1}=m_{i-1,2}$; $m_{i,2}=(m_{i,1} \times CGOK^{-1}_{i,1})$ mod (MNUM); $m_{cg}=m_{imax,2}$; and verifying MUPI=$m_{cg}$/mNoise and noise value=$m_{cg}$ mod mNoise, where MUPI is based on information descriptive of the state of a computing machine.

According to an alternative or additional embodiment, the machine secure unique product identifier (MSUPI) is transformed without having padded the machine unique product identifier (MUPI) such that the bit length the machine unique product identifier (MUPI) equals the bit length of the machine secure unique product identifier (MSUPI). According to an alternative or additional embodiment, authorizations are received from an authorization module can be transmitted to a verification module so that verification requests can be subsequently processed against those authorizations, and wherein data transmitted to the verification module can include the machine secure unique product identifier (MSUPI).

The methods described can be used in addition to or in place of encryption and can be used as a method for obfuscating numbers using a defined basis. The method can be used for any finite defined basis. The methods can be used on a predefined numeral basis, such as 0 to 9 when using numbers, or zero to F for hexadecimal. This method works on a defined basis that is not limited to the number of characters used in the normal range of characters for that basis.

For this method, a group is defined from which alphanumeric characters will be selected from; each of these groups is called a basis. An example would be 0→52 (inclusive of 0 and 52). Each of these numbers would be a single "character" that would be enciphered. Alternatively, one could define a basis of 0→932. Alternatives would allow for a combination of letters and numbers. As non-limiting examples, this can include ones from the English alphabet, Cyrillic alphabet, or any other alphabet in addition to numbers. The system allows for definition of the basis using any finite set or combination of sets as the bases for each of these to be counted as a single "character" when obfuscating the number. Any alphanumeric character set can be used as long as a numeric value is assigned for each character. This can be used to combine, for example, hexadecimal number sets and an alphabet.

Each character is assigned a numeric value, with a minimum value and a maximum value and these are then combined. For example, if combining a hexadecimal number and the Finnish Alphabet which has 29 letters, one can assign the values 0-15 for the hexadecimal numbers, such that 15 corresponds with 0, 14 corresponds with 1, down to 1 corresponding with B and 0 corresponding with A. With the Finnish alphabet, similarly the corresponding numbers can be 1 with A to 29 with Å (assuming only upper case letters are used) or one can assign 1 with L and count to where 18 corresponds to Å, 19 corresponds to A and 29 is assigned to K.

The assignment need not be linear, so long as it is stored which character or number is assigned to which numeric value. This can also be done dynamically, as well if further obfuscation is desired, as long as the assignments are recorded for later deciphering. With the example of using hexadecimal and a 29-character alphabet, the range could be MAX=Hex(max)*Alphabet(max)+Alphabet(max) while the minimum MIN=Hex(min)*Alphabet(min)+Alphabet(min). In both of these examples, there are two bases. This example provides a range basis of [1, 464]. This is because the Alphabet numbers run from 1 to 29, as opposed to 0 to 28 for the 29 characters. Alternatively, the same sets can be combined as MAX=Alphabet(max)*Hex(max)+Hex(max) and MIN=Alphabet(min)*Hex(min)+Hex(min) and provides a range basis of [0, 450]. Therefore, using the same component bases, it is possible to create various ranges to better obfuscate the numbers to be uses in the process.

In another example where the range basis is to be created, the range basis can be descriptive of the state of a computing machine, such as a combination of time and numeric identifiers. In this example, the range basis can be created using multiple bases. In this example, it is composed of five different bases and would be a combination of truncated Julian year (JY) [0-10], combined with Julian date (JD) [0-366], hour of the day (HR) [0-24], minute of the hour (Mins) [0-60] and a Time Identifier (TI) [0-2210], an additional incremental counter reset each minute. The number of bases that are used to create the range basis is defined as imax. An example of this embodiment is illustrated in FIG. 1.

The range is determined by converting the alphanumeric characters to a single range. For example, in this case, years are converted to days, then the total days to hours, total hours to minutes and then to incremental counters. One way to achieve this is to use the maximum numbers for each to obtain the top end of the range and the minimum numbers of each to determine the low end of the range. For example, maximum value MAX=(((JY(max)*JD(max)+JD(max)) *HR(max)+HR(max))*Mins(max)+Mins(max))*TI(max)+ TI(max). The minimum of the range is MIN=(((JY(min)*JD (min)+JD(min))*HR(min)+HR(min))*Mins(min)+Mins (min))*TI(min)+TI(min). In this example the range is [0, 12815659610].

Using the ranges of the above example, a Machine Unique Product Identifier (MUPI) can be defined. Defining it to fall within the value such that MUPI=(((JY*JD(max)+JD)*HR (max)+HR)*Mins(max)+Mins)*TI(max)+TI. To better obfuscate the number, a random component can be added in. This random number can be generated in any fashion as long as the range of the random number is known. This random number can be a digital signature that is generated using a secret and dynamic key sets. This can be done, for example, using a keyed hash message authentication code. For example, a MUPI combined with dynamic key, when using an extractor function, would yield the secret key, and MUPI combined with secret key using a hash function would be used to calculate the Noise value. This allows defining a value $m_{cg}$=MUPI*mNoise+Noise. This value MUPI is to be encrypted using the Code Generation Obfuscation Key (CGOK).

Two CGOK values may be used, the first $CGOK_{i,1}$, is a number that is co-prime with the maximum value of the range for MUPI. MNUM=JY(max)*JD(max)*HR (max)*Mins(max)*TI(max), which is 10*366*24*60*2210 in this example. The second $CGOK_{i,1}$, $CGOK_{i,2}$, is a number in the range [MIN, MNUM−1] with a bit size equal to or smaller than $CGOK_{i,1}$. To conduct the calculations, $m_{0,2}$ is defined to be equal to MUPI and defining MSUPI to be the maximum element of $m_{i,2}$, that being $m_{imax,2}$. If there are 8 bases comprising the range basis, then element MSUPI=$m_{8,2}$. MSUPI can then be combined with a Code Generator ID, CGID. This is conducted by shifting the CGID by the dimension of MSUPI such that m=CGID× (MNUM×mNoise)+MSUPI, where mNoise is the maximum possible value of Noise. The final code, Secure Unique Product Identifier (SUPI) is obtained by encrypting m using a global obfuscation code, p, which can be the same for all code generators. SUPI is defined as (p×m) mod (MNUM× mNoise×RunLim) and SUPI is converted to a 12-character alphanumeric code. An example of this embodiment is illustrated in FIG. 2.

The obfuscation method is reversible for verification of the process and products. This is accomplished by running the obfuscation process in reverse. This is possible because CGOK is coprime with MNUM and an Euler Totient function is used with respect to MNUM. This allows for calculation of the MUPI and MNUM from an MSUPI. Decrypting SUPI, therefore takes the following steps, m=$(p^{16 \times 34^{11}-1} \times$ SUPI) mod (MNUM×mNoise×RunLim). From m the MSUPI and CGID can be extracted, MSUPI=m mod (MNUM×mNoise) and CGID=m/(MNUM×mNoise). From here, MSUPI is deobfuscated using the inverse of CGOK. Because the CGID is known, it can be used to retrieve from a database the proper CGOKs. MUPI=$m_{cg}$/mNoise and the noise value can be checked as well because noise=$m_{cg}$ mod mNoise.

Example Implementation

In another aspect of the disclosure, the methods described herein may be implemented in a computing environment as described herein using executable instructions. An example set of instructions for generating an obfuscated secure product identifier is as follows:

```
//codeGenID
int id = 122334;
int noise = 345;
var gr = new int[12];
int noiseSize = 1;
for (int i = 0; i < 12; i++)
{
    gr[i] = (id % numberOfGroups);
    noiseSize = noiseSize * Groups[id % numberOfGroups].Length;
    id = id / numberOfGroups;
}
var usedNoise = noise % noiseSize;
StringBuilder stb = new StringBuilder(12);
for (int i = 0; i < 12; i++)
{
    stb.Append(Groups[gr[i]][noise % Groups[gr[i]].Length]);
    noise = noise / Groups[gr[i]].Length;
}
Console.WriteLine("Code = " +stb.ToString( ));
string code = "GFL1BARARARA";
id = 0;
usedNoise = 0;
int carryOver = 0;
for (int i = 11; i >= 0; i--)
{
    var ch = code[i];
    for (int j = 0; j < numberOfGroups; j++)
    {
        var index = Groups[j].IndexOf(ch);
        if (index >= 0)
        {
            id = id * numberOfGroups + j;
            usedNoise = usedNoise * carryOver + index;
            carryOver = Groups[j].Length;
        }
    }
}
Console.WriteLine("Id = " + id);
}
```

Symmetric key algorithms such as 3DES, AES, and others operate on blocks of input data. For this to happen, the length of the input data must be exactly equal to the block length or an integral multiple of the block length for that algorithm. In the example of AES 128-bit encryption, the block length may be 128-bits, or 16-bytes. The input data to be encrypted could have, for example, a size of 20-bytes, 4-bytes off the block length in this example. In order to make the input data length a multiple of the block length, the input data needs to be padded. In this case, the padding would be calculated as: 20 bytes requires (16−(20−16))=12 bytes of padding. Thus, this padding can significantly increase the size of the encrypted data set, similarly increasing the amount of physical data storage required to store the encrypted data. As is evident from the example implementation above, the inventive obfuscation method can be configured to obfuscate data, such as product identifiers, without requiring padding of the input product identifier data.

Integration with Secure Production Systems

The systems and methods described above for obfuscating data can be advantageously used in combination with systems for authenticating a production of products. In another aspect of the disclosure, there is provided a method for authenticating a production of products, the method including electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

As used herein, an entity may refer to: i) a person, such as a consumer of a product; ii) a group, such as a group having a common interest, such as retailers; iii) a computing device; iv) a computing node in a networked system; v) a storage location, such as a memory storage unit storing a document; vi) a virtual point in a network, such as representing a business function within a business enterprise, and the like. Additionally, an entity may represent a point in a workflow, such as for authorization, which may be performed by a person responsible for that aspect of the workflow or a computing device which provides automated processing. The term entity is not meant to be limited to any one of these examples and may extend to other situations consistent with the concepts described herein.

System Modules

Various modules are described below. Any of the modules can be co-located physically, or located remotely from each other. Additionally, any of the modules could be logically or physically combined into a single module without departing from the scope of the invention.

Control Module

Figure 3:
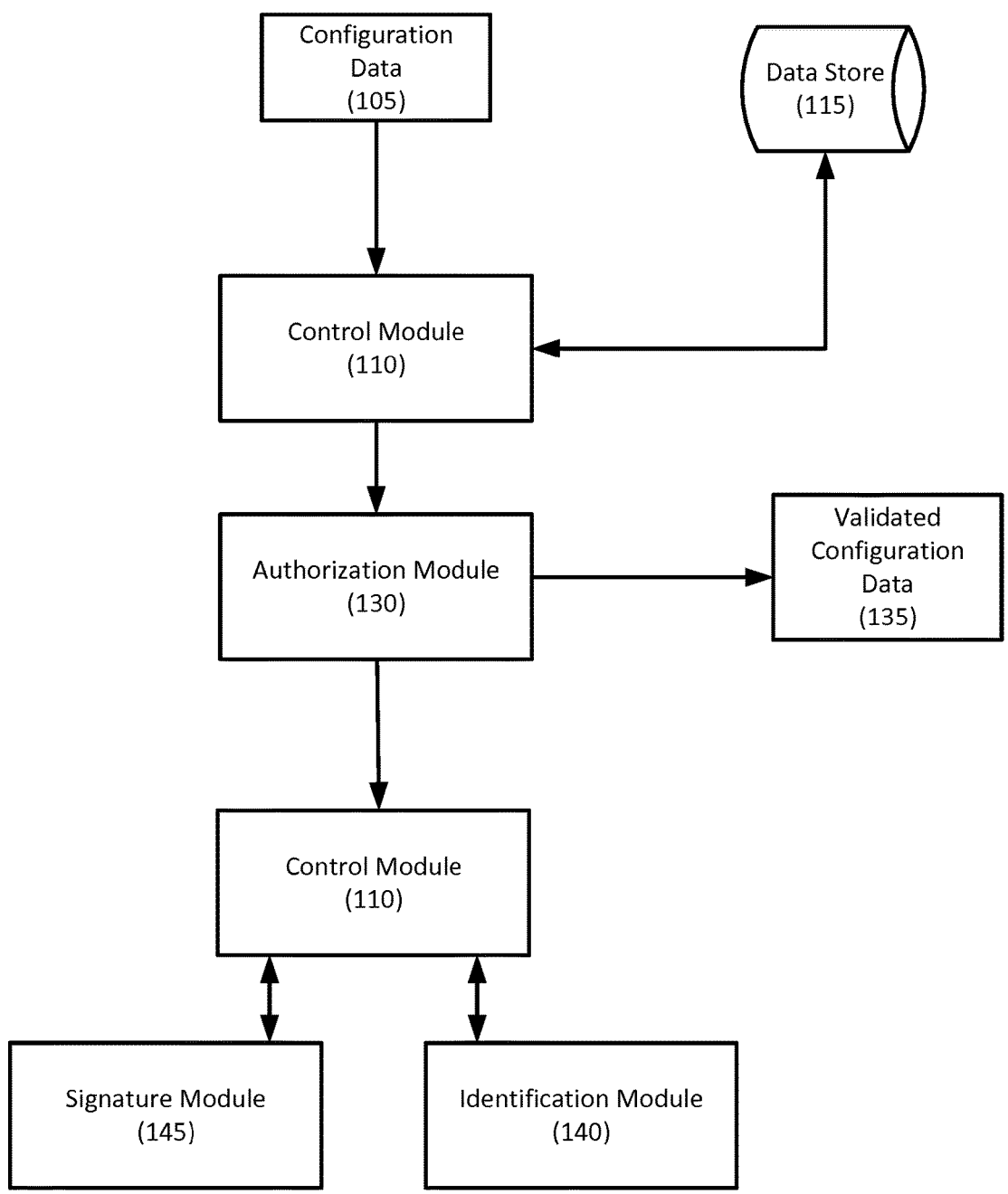
FIG. 3 illustrates an example method for code initialization.

With reference to FIG. 3, the Control Module (also known as the "Orchestrator") (110) can receive input from any of the other modules or outside sources and can provide instructions to the other modules in the system based on pre-configured programs and/or the operator inputs to it. It can also generate a dashboard summary of the system status.

Input to the Control Module can include any or all configuration data (105). The supplied configuration data can indicate any or all of the parameters including, but not limited to, machine for production, production line, factory, product to be produced, and volume of product. The configuration data may indicate what items (for example, products) are to be marked with the secure identifiers and how those items may be produced. The configuration data may indicate a range of products, such as starting and ending product identifiers. In some embodiments, the range can be a set of product identifiers. The configuration data may be provided by an operator of the system or be dynamically or automatically generated. The configuration data can include further executable instructions or an interpretable algorithm. The configuration data may be based on operator input or the output of a manufacturing execution system, or other centralized system for instructing how and what to produce.

The Control Module (110) can transmit the configuration data to any module, including but not limited to the Authorization Module (130), the Identification Module (140), and the Signature Module (145).

The Control Module can request authorization from the Authorization Module to execute a production operation. This process involves transmitting a request (including some or all of the configuration data) to the Authorization Module and receiving signed or encrypted configuration data. In some embodiments, the Authorization Module can return the configuration data to the Control Module, including a digital signature applied to that configuration data. The Authorization Module determines whether to authorize the request from the Control Module based on the data it receives. In addition, the information returned by the Authorization Module included in the Configuration data can be used to bound the codes generated with the authorization provided. As the data is signed by the Authorization Module, the system can be prevented from modifying the configuration data. As a non-limiting example, a modification of a request to produce one brand on in place of another may be controlled, allowed, or denied.

Authorizations received from the Authorization Module can also be transmitted to the Verification Module so that verification requests can be subsequently processed against those authorizations. The data transmitted to the Verification Module can include a secure identifier, as well as any of the configuration data. In some examples, the configuration data sent to the Authorization Module can include product range information.

The signed or validated configuration data can be the some or all of the set of input parameters of the Control Module, verified and validated by the Authorization Module, which remains in force during a production. A security token can be an output from the Authorization Module and/or an input parameter of the Control Module. The security token can be a proof that the product identifier corresponds to validated configuration data and therefore to an authorized production. The security token can be an input to the Signature Module to generate a signature for a single product identifier, or the signature of a single product identifier, or a product identifier itself, or a range of products or product identifiers. The security token can be a unique code, a random code, or a pseudo-random code. The security token can be any numerical, or alphabetic, or combination of numeric and alphabetic characters.

Authorization Module

The Authorization Module operates to validate requests for authorization to take an action in the identification system. In some embodiments, it can operate as a license manager.

The Authorization Module can receive the configuration data. The Authorization Module can also receive range and/or algorithm information. In some embodiments, the Authorization Module can receive input configuration data from the Control Module. The output range can optionally identify a range of products, machines, factories, ranges, or product volumes that are authorized. The output can also include range information and/or include an algorithm which comprises a set of executable or interpretable instructions that will be used to generate the security token. The Authorization Module can be centralized at the factory level or be decentralized on each production line, or a combination of both.

The Authorization Module can store and/or generate one or more encryption keys. In some embodiments, the key stored by the Authorization Module can be a private public encryption key according to a public key infrastructure (PKI). In some embodiments, the Authorization Module stores the only copy of the private key. In other embodiments, the Authorization Module is distributed across several instances which replicate the keys between them. In the case of PKI, the Authorization Module can output signed configuration data. In some embodiments, the Authorization Module can encrypt the configuration data and/or sign the configuration data output.

In some embodiments, the system is configured so that only the Authorization Module can read the secured input parameters of the Control Module, required for the generation of the security token. In some embodiments, the key is provided to the Authorization Module from another source.

The Authorization Module can be embodied as a hardware security module (HSM), or another type of physical computing device that safeguards and manages digital keys for strong authentication and providing cryptoprocessing. The Authorization Module functionality can be performed by a computer with an embedded board with an encryption key or PKI private key. The module can be equipped with features such that attempts to access the data will result in it being rendered unreadable or inaccessible.

If the input to the Authorization Module is a range and an algorithm, the Authorization Module can output an identity in the range of authorization and a security token of the identifier. For example, the output identity can be a range from 0 to 1,000 with a security token for each item in the range.

The Authorization Module can generate a key from any parameter used in the Control Module. In some embodiments, the Authorization Module may generate or derive a key from an existing key from any parameter used in the Control Module such that only a specific Authorization Module can use this key. The equipment and software implementing this public key technique can be embodied in an asymmetric cryptosystem.

The output of the Authorization Module can be information, such as the configuration data and, optionally, one or more security tokens, with a digital signature provided by the Signature Module. Alternatively, the output of the Authorization Module can be the configuration data encrypted to a key held by the Authorization Module. The output of the Authorization Module can be provided to the Control Module.

According to an embodiment, the method for authenticating a production of products includes electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

In an alternative or additional embodiment, the configuration data represents a range of products to be produced. In an alternative or additional embodiment, the configuration data represents a range of products, machines, factories, ranges, or product volumes that are authorized. Alternative or additional embodiments can include receiving a verification request, the request comprising a product identifier and determining if the configuration data for the production run is authorized by reference to a license manager. Alternative or additional embodiments can include generating a security token for a range of products; and associating the security token with the range of products.

Signature Module

The Signature Module can receive the configuration data, an authorization key, a security token or any combination of them, as well as a unique product identifier generated by the Identification Module. In some embodiments, the Signature Module may receive, in addition, one or more intrinsic machine and/or product characteristics, and/or product item characteristics. The Signature Module can create a digital signature based on any or all of those inputs, generally referred to herein as configuration data.

To generate the digital signature, in some embodiments, the Signature Module can first generate a digest or other representation of the configuration data. In some embodiments, the digest can be generated by calculating a cryptographic hash value of the configuration data according to a digital signature algorithm provided by the Signature Module executing the digital signature algorithm. As non-limiting examples, the hash may be calculated according to MD5, SHA-1, SHA-2, SHA-3/Keccak functions. The digest can then be encrypted using a private key obtained by the Signature Module to generate the digital signature.

In some embodiments, a digital signature may use a Public Key Infrastructure (PKI) technology to establish authenticity of configuration data. PKI systems use certificates and keys to identify entities, individuals, or organizations. The Authentication Module uses a private key to sign the configuration data and associates the configuration data with a certificate including the public key used by the Authentication Module.

A recipient module uses a public key to verify the digital signature and, thereby, the authenticity of the signed configuration data. Supporting technologies can be employed to establish other non-repudiation features, such as the time of signing and the status of the signing keys. The public key may be provided to the recipient entity directly, or by publication in an on-line repository or directory.

Identification Module

The Identification Module can receive the configuration data and generate identifiers for items to be marked. The Identification Module can receive a digital signature generated by the Signature Module that will be combined with the unique identifier to generate a compound unique identifier.

The identifiers can include, or be based on, the date and/or time of production of a product to be marked and the digital signature received from the Signature Module. In some embodiments, the secure identifiers generated can be unique or substantially unique. In some embodiments, the secure identifiers can be the security token.

In the case of ranges, the Identification Module can generate a range identifier and a set of identifiers within the generated range.

The identifiers created may be output to a print control module for direct printing on to a product or may be input to further processing to generate another code that is printed on product packaging.

Verification Module

Figure 5:
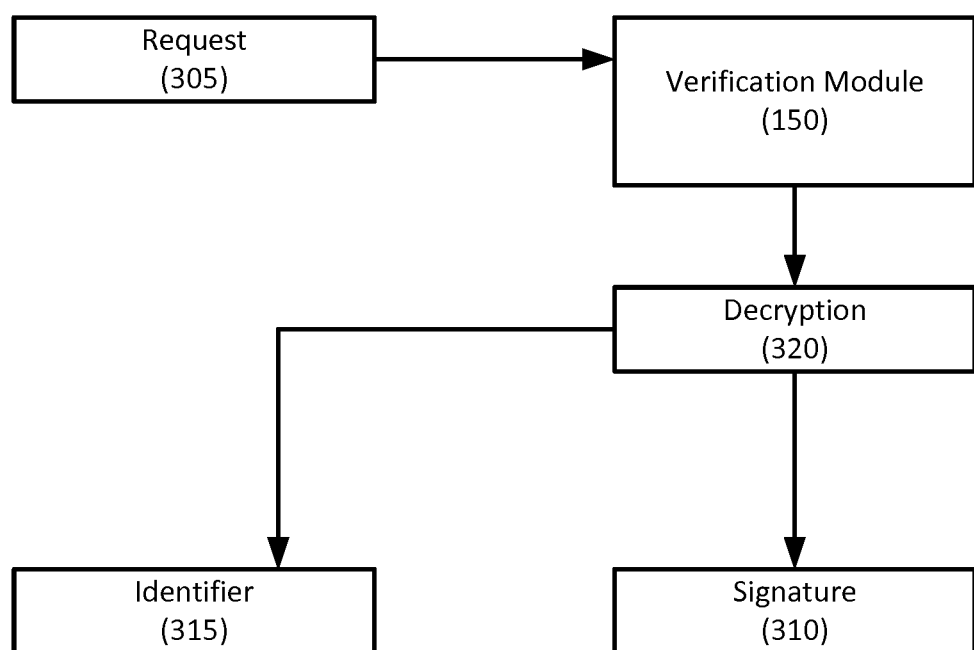
FIG. 5 illustrates an example method for code authorization.

With reference to FIG. 5, the Verification Module (150) can receive the verified configuration data and, based on that validated configuration data, validate a request for authorization (305) for a factory, machine, product, or production volume reported. The inputs to the Verification Module can include any or all of the verified configuration data, output from the signature module, identifiers, security tokens, and/or range information. The Verification Module can generate information for an Authorization Module with these parameters in order to verify/validate a product identifier.

The Verification Module can generate a decryption (320) of the request, which includes one or more identifiers or ranges of identifiers (315) and signature data (310) including one or more security tokens.

If a security token is input to the Verification Module, the Verification Module can return information relating to the authorization, the configuration data, and/or ranges. If a single security token is used for a range of products, the security token can be provided to the Verification Module to verify parameters associated with the range of products, rather than individual products. This embodiment may be particularly useful in the context of export regulation.

System Processes

Identification Code Initialization

Identification Code Initialization can be performed to validate the authorization and the parameters. In some embodiments, for performance reasons, this can be performed once at the beginning of the production. With reference to FIG. 3, the Control Module (110) can access a data store (115) for additional parameters, or additional parameters can be provided to the module. The parameters and the configuration data, once signed by the Authorization Module (130), form the validated configuration data (135). The Control Module receives verified configuration data as described above, in response to its request to the Authorization Module (130).

The authorization can be an authorization to produce a product, or to mark a product with a certain ID, or both. The configuration data and the additional parameters are transmitted to the Authorization Module and are used by the Authorization Module to generate the security token. The Authorization Module can sign the configuration data and the additional parameters, forming the signed configuration data. As discussed above, the configuration data can specify a certain production run or other products and activities. The Authorization Module can generate an authorization block including a key, authorized identifiers, and security token. In some embodiments, the key may be generated by the Authorization Module, or may be provided to it. The Authorization Module can transmit the authorization block to the Control Module. The Control Module can transmit the validated configuration data and other information, such as a list of identifiers, a range of identifiers, and/or one or more security tokens, to the Signature Module (145). The Signature Module can sign the data and send the signed data and the signature to the Control Module. The Identification Module (140) can then receive from the Control Module an initialization block including the identifiers and/or ranges of identifiers for products.

An embodiment of the invention can include a method for initializing a process for securely controlling a production facility, comprising: electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; and at the signature module, signing the validated configuration data.

Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Alternative or additional embodiments can include receiving the digitally signed configuration data and the digital signature at a production machine; at the production machine, verifying the digital signature associated with the digitally signed configuration data; and calculating a set of secure product identifiers based on the digitally signed configuration data.

Alternative or additional embodiments can include producing products in a production run according to the digitally signed configuration data; and printing the set of secure product identifiers on the products according to the digitally signed configuration data.

Alternative or additional embodiments can include determining whether the production run is authorized further comprises retrieving licensing data from a licensing server.

Identification Code Generation

Figure 4:
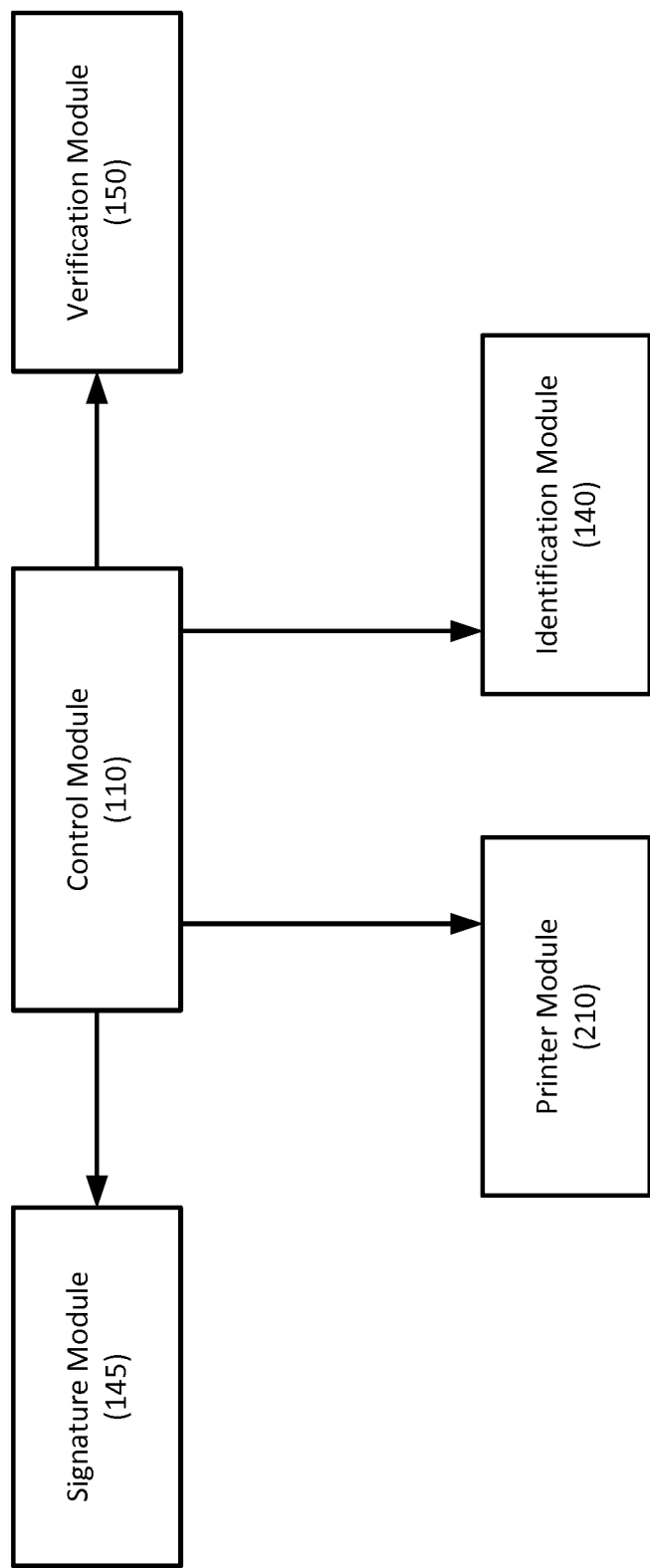
FIG. 4 illustrates an example method for code generation.

With reference to FIG. 4, the Code Generation process generates the codes during the production process. The identification code generation process can begin with a request to the Identification Module (140) for an identifier or a range of identifiers, which are then returned to the Control Module (110). The identifiers are then sent to the Signature Module (145), which signs the identifiers and returns the signed identifiers to the Control Module. The Signature Module can receive a security token. In some embodiments, the Signature Module does not need to be controlled by external instructions and if any identification code is to be counted, the code can be linked to a single security token. The Signature Module can be controlled by the Authorization Module. The Control Module can then send the output data to print control in Printer Module (210). The output data sent to the print control may be encrypted before transmission. The configuration data, can be transmitted to the Verification Module (150) for the handling of subsequent verification requests.

An embodiment of the invention includes a method for generating a code for securely identifying products produced at a production facility, including electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; at the signature module, signing the validated configuration data; at an identification module, receiving a request for a product identifier and generating a product identifier in response to the request; transmitting the product identifier from the identification module to a signature module; digitally signing the product identifier at the signature module; and transmitting the digitally signed product identifier to a printer module.

Alternative or additional embodiments can include electronically receiving configuration data from an electronic data store; electronically storing the configuration data for a production run, wherein the configuration data for the production run specifies parameters used in the production of products; transmitting the configuration data to an authorization module; at an authorization module: determining whether the production run is authorized; generating validated configuration data comprising a key, a representation of a plurality of authorized product identifiers, and a security token; transmitting the validated configuration data to a signature module; at the signature module, signing the validated configuration data.

In alternative or additional embodiments, the request is for a range of identifiers. Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Verification of Identification Code

The Verification Module can receive a request for verification. The request can include one or more identification codes. The verification module can decrypt or otherwise deobfuscate the identifier code received. The resulting information, having been decrypted, can include a signature component and an identifier. The resulting identifier can then be linked against the original configuration data previously stored in association with the identifier. The linked data can include other identifiers in a range, a security token, and other information stored in connection with the production of the product bearing that identification code.

Some embodiments can include additional functionality for processing identifiers that are provided to the Verification Module based on the party requesting the verification of the code. Different parties can be provided with different means to access the Verification Module. For example, a retailer or other form of merchant, may be provided with a different portal or communication channel than a consumer. The retailer may also be required to authenticate itself to the Verification Module.

In some embodiments, the system can be configured so that a verification by a consumer results in an identifier being marked as having been verified. The system can be further configured to store those codes for which verification is requested by a consumer. Any subsequent requests for verification of those already-verified codes can be denied or otherwise processed differentially.

Export Functions

Embodiments of the invention can be applied in the context of code export to third-parties. Those embodiments can include an export function configured to generate a separate code for this purpose. The exported code can be generated by collecting one or more product identifiers and/or security tokens, and signing those identifiers and/or tokens. The identifiers and/or tokens can be collected at any point in the production process. The signed identifiers and/or tokens in the form of exported codes can be provided to a third party who can store them and perform verification of the validity of the identifiers and/or tokens.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A computerized method for obfuscating data stored on a network using a hardware processor and a hardware memory coupled to the processor, the method comprising:
   defining and storing information descriptive of a state of a computing machine as machine number (MNUM), the information descriptive of the state including a number of bases comprising the information descriptive of the state;
   generating a machine secure unique product identifier (MSUPI), as a reversible mathematical transformation of a machine unique product identifier (MUPI), based on information descriptive of the state of a computing machine, the step of generating the MSUPI comprising:
   defining a number of steps to be imax, for each step generating a first random number Code Generation Obfuscation Key ($CGOK_{i,1}$) and a second random number Code Generation Obfuscation Key ($CGOKi_{i,2}$), generating comprising:
      calculating a first random number ($CGOK_{i,1}$) coprime with a number based on the information descriptive of the state of the computing machine (MNUM);
      calculating a second random number ($CGOK_{i,2}$) having equal or fewer bit size as (MNUM);
      defining $m_{0,2}$=MUPI;
      calculating for each element i, from i=1 to imax−1:
      $m_{i,1}=(m_{i-1,2} \times CGOK_{i,1})$ mod (MNUM);
      $m_{i,2}=(m_{i,1}$ mod $CGOK_{i,2})$;
      if $(m_{i,2}>$MNUM$) \rightarrow m_{i,2}=m_{i,1}$;
      defining MSUPI=$m_{imax,2}$;
   and
   transmitting the machine secure unique product identifier (MSUPI), or a code generated with the machine secure unique product identifier (MSUPI) as input, to a printer module for printing on a commercial item.

2. The method according to claim 1, wherein the information descriptive of the state of the computing machine comprises a combination of time information and product number.

3. The method according to claim 2, wherein the time information includes Julian year, Julian day, production hour, and production minute.

4. The method according to claim 1, wherein the information descriptive of the state includes a value of an incremental counter reset on a periodic basis.

5. The method according to claim 1, wherein the number based on the information descriptive of the state of the computing machine is calculated as 10×366×24×60×Time Identifier.

6. The method according to claim 5, where the Time Identifier is defined as an integer 2210.

7. The method according to claim 1, where a Secure Unique Product Identifier (SUPI), a 12-character alphanumeric code is obtained such that SUPI=(p×m) mod (MNUM×mNoise×RunLim).

8. A computerized method for generating a code for securely identifying products produced at a production facility using a hardware processor and a hardware memory coupled to the processor, the method comprising:
   electronically receiving configuration data from an electronic data store;
   electronically storing the configuration data for a production run, wherein the configuration data for the production run specifies parameters used in a production of products;
   transmitting the configuration data to an authorization module;

at the authorization module:
   determining whether the production run is authorized;
   generating validated configuration data comprising a key, a representation of a plurality of authorized product identifiers, and a security token;
transmitting the validated configuration data to a signature module;
at the signature module, signing the validated configuration data;
at an identification module, receiving a request for a product identifier, wherein the request is for a range of identifiers, and generating a product identifier in response to the request, wherein generating the product identifier is performed by:
defining and storing information descriptive of a state of a computing machine as machine number (MNUM), the information descriptive of the state including a number of bases comprising the information descriptive of the state;
generating a machine secure unique product identifier (MSUPI), as a reversible mathematical transformation of a machine unique product identifier (MUPI), based on information descriptive of the state of a computing machine, the step of generating the MSUPI comprising:
defining a number of steps to be imax, for each step generating a first random number Code Generation Obfuscation Key ($CGOK_{i,1}$) and a second random number Code Generation Obfuscation Key ($CGOK_{i,2}$), generating comprising:
   calculating a first random number ($CGOK_{i,1}$) coprime with a number based on the information descriptive of the state of the computing machine (MNUM);
   calculating a second random number ($CGOK_{i,2}$) having equal or fewer bit size as (MNUM);
defining $m_{0,2}$=MUPI;
calculating for each element i, from i=1 to imax−1:
   $m_{i,1}=(m_{i-1,2} \times CGOK_{i,1})$ mod (MNUM);
   $m_{i,2}=(m_{i,1}$ mod $CGOK_{i,2})$;
   if $(m_{i,2}>MNUM) \rightarrow m_{i,2}=m_{i,1}$;
defining MSUPI=$m_{imax,2}$;
transmitting the machine secure unique product identifier (MSUPI) from the identification module to the signature module;
digitally signing the machine secure unique product identifier (MSUPI) at the signature module; and
transmitting the digitally signed machine secure unique product identifier (MSUPI), or a code generated with the machine secure unique product identifier (MSUPI) as input, to a printer module for printing on a commercial item.

9. The method according to claim 8, wherein the request is for a range of identifiers.

10. The method according to claim 8, further comprising:
determining if the configuration data for the production run is authorized;
if the production run is authorized:
   generating a security token and associating the token with the configuration data; and
   digitally signing the configuration data by generating a digital signature and associating the digital signature with the configuration data.

11. The method according to claim 8, wherein the machine unique product identifier (MUPI) is transformed without padding the machine unique product identifier (MUPI) such that a bit length of the machine unique product identifier (MUPI) equals a bit length of the machine secure unique product identifier (MSUPI).

12. The method according to claim 8, wherein the information descriptive of the state of the computing machine comprises a combination of time information and product number.

13. The method according to claim 8, wherein the information descriptive of the state includes a value of an incremental counter reset on a periodic basis.

14. A computerized method for verification of a secure machine unique product identifier using a hardware processor and a hardware memory coupled to the processor, the method, comprising:
at a verification module executing in the hardware processor:
receiving for verification a machine secure unique product identifier MSUPI previously printed on a commercial item;
assigning MSUPI as $m_{0,2}$;
   the verification module retrieving a first random number $CGOK_{i,1}$ and a second random number, $CGOK_{i,2}$ and imax associated with the retrieved random numbers and received MSUPI;
   calculating for each element i, from i=1 to imax−1:
      $m_{i,1}=(m_{i-1,2}$ mod $CGOK_{i,2})$;
      if $(m_{i,2}>$a machine number (MNUM))$\rightarrow m_{i,1}=m_{i-1,2}$;
      $m_{i,2}=(m_{i,1} \times CGOK^{-1}_{i,1})$ mod (MNUM);
      $m_{cg}=m_{imax,2}$;
verifying a machine unique product identifier (MUPI)= $m_{cg}$/mNoise and noise value=$m_{cg}$ mod mNoise, where MUPI is based on information descriptive of a state of a computing machine; and
outputting a result of the verification to the hardware memory to confirm the commercial item to be authentic.

15. The method according to claim 14, wherein the machine secure unique product identifier (MSUPI) is transformed without having padded the machine unique product identifier (MUPI) such that a bit length of the machine unique product identifier (MUPI) equals a bit length of the machine secure unique product identifier (MSUPI).

16. The method according to claim 14, wherein authorizations are received from an authorization module that can be transmitted to a verification module so that verification requests can be subsequently processed against those authorizations, and wherein data transmitted to the verification module can include the machine secure unique product identifier (MSUPI).

17. A computerized system for obfuscating data stored on a network, the system comprising:
a computer hardware processor coupled to a hardware memory, the system configured for:
defining and storing information descriptive of a state of a computing machine as machine number (MNUM), the information descriptive of the state including a number of bases comprising the information descriptive of the state;
generating a machine secure unique product identifier (MSUPI), as a reversible mathematical transformation of a machine unique product identifier (MUPI), based on information descriptive of the state of a computing machine, the step of generating the MSUPI comprising:
defining a number of steps to be imax, for each step generating a first random number Code Generation Obfuscation Key ($CGOK_{i,1}$) and a second random number Code Generation Obfuscation Key ($CGOK_{i,2}$), generating comprising:

calculating a first random number (CGOK$_{i,1}$) coprime with a number based on the information descriptive of the state of the computing machine (MNUM);

calculating a second random number (CGOK$_{i,2}$) having equal or fewer bit size as (MNUM);

defining m$_{0,2}$=MUPI;

calculating for each element i, from i=1 to imax−1:

m$_{i,1}$=(m$_{i-1,2}$×CGOK$_{i,1}$) mod (MNUM);

m$_{i,2}$=(m$_{i,1}$ mod CGOK$_{i,2}$);

if (m$_{i,2}$>MNUM)→m$_{i,2}$=m$_{i,1}$;

defining MSUPI=m$_{imax,2}$; and transmitting the machine secure unique product identifier (MSUPI), or a code generated with the machine secure unique product identifier (MSUPI) as input, to a printer module for printing on a commercial item.

18. A system for generating a code for securely identifying products produced at a production facility, comprising a hardware processor coupled to a hardware memory for storing instructions, the system configured for executing instructions for:

electronically receiving configuration data from an electronic data store;

electronically storing the configuration data for a production run, wherein the configuration data for the production run specifies parameters used in a production of products;

transmitting the configuration data to an authorization module;

at the authorization module:
determining whether the production run is authorized;
generating validated configuration data comprising a key, a representation of a plurality of authorized product identifiers, and a security token;

transmitting the validated configuration data to a signature module;

at the signature module, signing the validated configuration data;

at an identification module, receiving a request for a product identifier and generating a product identifier in response to the request, wherein generating the product identifier is performed by:

defining and storing information descriptive of a state of a computing machine as machine number (MNUM), the information descriptive of the state including a number of bases comprising the information descriptive of the state;

generating a machine secure unique product identifier (MSUPI), as a reversible mathematical transformation of a machine unique product identifier (MUPI), based on information descriptive of the state of a computing machine, the step of generating the MSUPI comprising:

defining a number of steps to be imax, for each step generating a first random number Code Generation Obfuscation Key (CGOK$_{i,1}$) and a second random number Code Generation Obfuscation Key (CGOK$_{i,2}$), generating comprising:

calculating a first random number (CGOK$_{i,1}$) coprime with a number based on the information descriptive of the state of the computing machine (MNUM);

calculating a second random number (CGOK$_{i,2}$) having equal or fewer bit size as (MNUM);

defining m$_{0,2}$=MUPI;

calculating for each element i, from i=1 to imax−1:

m$_{i,1}$=(m$_{i-1,2}$×CGOK$_{i,1}$) mod (MNUM);

m$_{i,2}$=(m$_{i,1}$ mod CGOK$_{i,2}$);

if (m$_{i,2}$>MNUM)→m$_{i,2}$=m$_{i,1}$;

defining MSUPI=m$_{imax,2}$;

transmitting the machine secure unique product identifier (MSUPI) from the identification module to the signature module for use as the product identifier;

digitally signing the machine secure unique product identifier (MSUPI) at the signature module; and transmitting the digitally signed machine secure unique product identifier (MSUPI), or a code generated with the machine secure unique product identifier (MSUPI) as input, to a printer module for printing on a commercial item.

19. The system according to claim 18, wherein the information descriptive of the state of the computing machine comprises a combination of time information and product number.

20. The system according to claim 18, wherein the information descriptive of the state includes a value of an incremental counter reset on a periodic basis.

\* \* \* \* \*